United States Patent [19]

Lucas et al.

[11] 4,048,828

[45] Sept. 20, 1977

[54] PROCESS FOR MANUFACTURING MONOBLOC WHEELS BY DIE STAMPING AND ROTARY EXTRUSION

[75] Inventors: Roger Lucas, Issoire; Jacques Auberger, Jumeaux, both of France

[73] Assignee: Forgeal, Societe pour le Forgeage et l'Estampage des Alliages Legers, Paris, France

[21] Appl. No.: 665,264

[22] Filed: Mar. 9, 1976

[30] Foreign Application Priority Data

Apr. 9, 1975 France .................... 75.11726
Dec. 3, 1975 France .................... 75.37697

[51] Int. Cl.$^2$ .................... B21D 22/14; B21H 1/02
[52] U.S. Cl. .................... 72/83; 29/159.01; 72/85
[58] Field of Search .................... 72/68, 82, 83, 85; 29/159 R, 159 A, 159.01, 159.1

[56] References Cited

U.S. PATENT DOCUMENTS

| | | | |
|---|---|---|---|
| 2,075,294 | 3/1937 | Le June | 29/159 R |
| 3,205,688 | 9/1965 | Paulton | 29/159.01 X |
| 3,255,518 | 6/1966 | Golota | 29/159.1 |
| 3,264,719 | 8/1966 | Adam et al. | 29/159.01 |

Primary Examiner—Leon Gilden
Attorney, Agent, or Firm—Dennison, Dennison, Meserole & Pollack

[57] ABSTRACT

A process for manufacturing monobloc wheels for vehicles from a roughly shaped article having the shape of a cylindrical disc. A sequence of die stamping and rotary extrusion operations is carried out on the disc to arrive at the definitive shape, which does not require more than a few finishing operations by mechanical machining. These wheels which may in particular be made of light, aluminum-based alloys, are especially suitable for large tanker vehicles equipped with tubeless tires.

10 Claims, 2 Drawing Figures

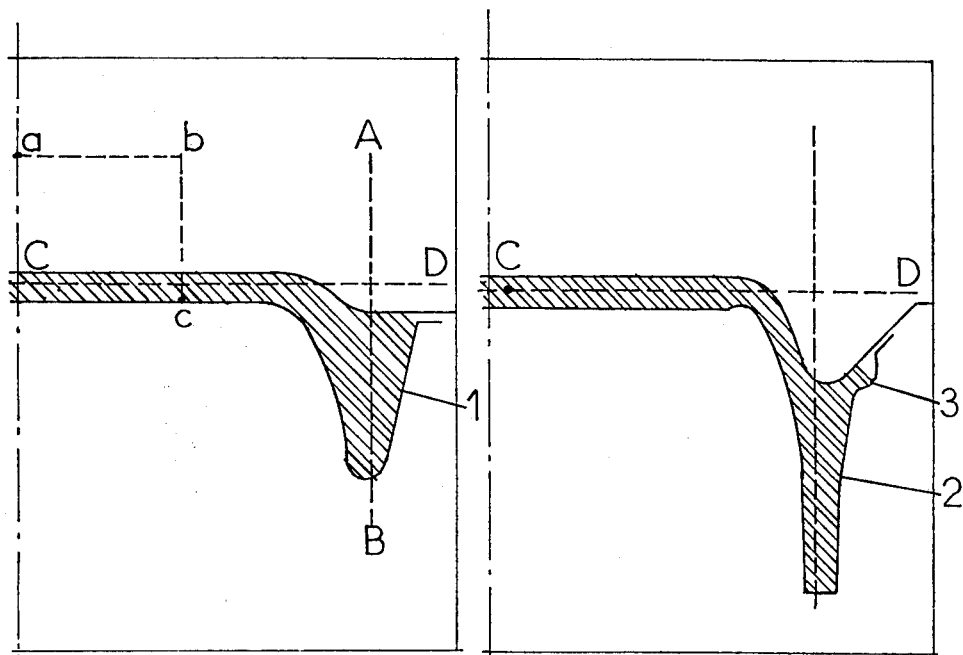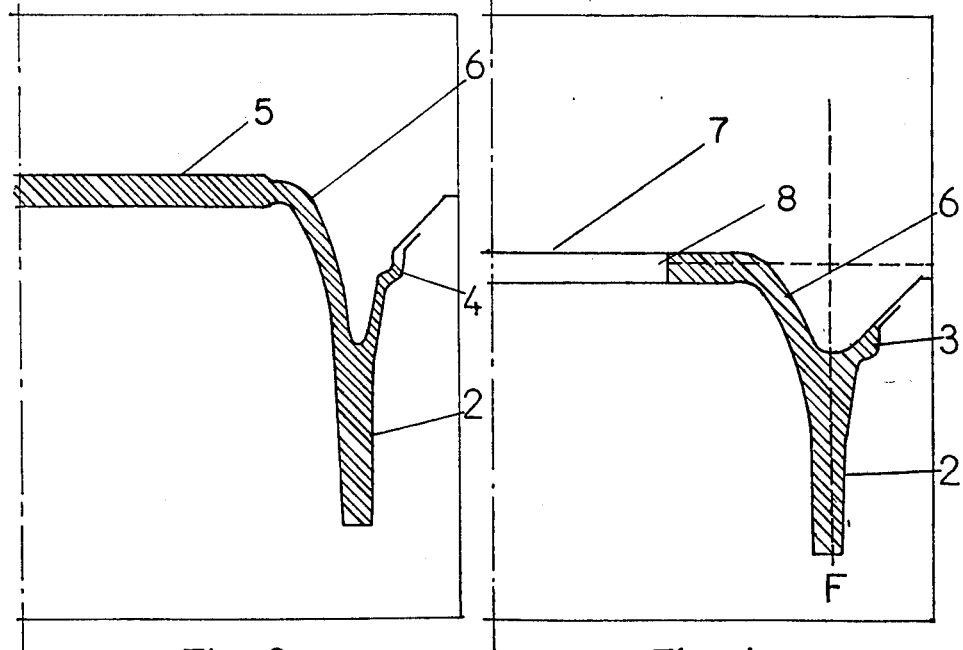

PROCESS FOR MANUFACTURING MONOBLOC WHEELS BY DIE STAMPING AND ROTARY EXTRUSION

The present invention relates to a process for manufacturing monobloc (one-piece) wheels for large tanker vehicles intended to be equipped with tires with, or preferably, without inner tubes, the said wheels being manufactured by die stamping and rotary extrusion.

Basically, a wheel of the type herein disclosed comprises a central disc and a rim. The disc is integral with the rim and serves as a securement means to the hub of the vehicle. The disc is normally dish-shaped, with a concave face turned towards the hub, that is to say axially (with respect to the axis of rotation) towards the interior of the vehicle in order to provide a housing for a conventional brake mechanism. The disc has a plurality of holes for receiving bolts for securing the wheel to the hub, and also a central bore.

The rim may have a flat or hollow base. The hollow base wheel is a monobloc (one-piece) wheel which contains no removable parts, and is particularly suitable for mounting tubless tires since it is easy to make it air-tight to compressed air. Each wall of the channel is extended by a conical portion (the angle of conicity generally beng 15° with respect to the axis of the wheel) called a seat, and intended to receive one of the beads of the tire. A short flange, bent back in the form of a hook, forms the end portion of each of the seats. That part of the flange of the rim which is turned axially towards the exterior of the vehicle is generally called the small flange, and that part which is turned axially towards the interior of the vehicle is called the large flange, the difference being due to the asymmetric position of the connecting zone between the disc and the rim.

Wheels for large tanker vehicles are usually made in the prior art manner from stamped and welded steel sheet. This method of manufacture is suitable for large scale production and is relatively cheap. However, a welded assembly does not lend itself well to the rigorous balancing and centering of the wheel, and especially to an air-tight construction, which is absolutely necessary for fitting tubeless tires; it also constitutes a weak point which restricts the useful life. A heavy duty truck often has 12 to 16 wheels plus one or two spare wheels, and the total weight of the wheels themselves may be some 700 to 900 kg. The use of monobloc wheels made of high strength alloys, and, especially, of light alloys, would lead to a noticeable reduction in weight, would facilitate balancing and centering, and would ensure the air-tightness absolutely necessary when using tubeless tires.

Numerous attempts have been made to produce wheels from light alloys or mixed wheels from steel and light alloy, either by casting or by machining and/or rotary extrusion. Processes have been described in particular in U.S. Pat. Nos. 2,075,294 (Kelsey-Hayes) and 2,170,617 (Hamill); in United Kingdom Patents Nos. 507,801 (Dunlop), 971,258 and 971,259 (Reynolds); and in German patents or applications 1,297,570 (Otto Fuchs) and 1,570,620 (Aluminium Francais). However, up to the present time none of the prior processes has enabled monobloc wheels to be produced under satisfactory technical and/or economic conditions, either on account of the fact that they do not lend themselves to mass production at an attractive cost price, or on account of the fact that the wheels obtained do not satisfy the requirements of the users, namely mechanical strength, impact resistance, corrosion resistance, in particular in regions where salts are used to assist in the melting of snow, ease of servicing and maintenance (non-tarnishing and lasting new appearance of the wheel), ease of balancing and centering, air-tightness for using tubeless tires, and accuracy of the dimensional details, enabling tires of all types to be safely and reliably fitted without any risk of their coming off.

The present invention relates to a process for producing monobloc wheels for large tanker vehicles, which lends itself particularly well to mass production and provides wheels which meet the requirements of users such as have just been enumerated above.

The process is characterized by a combination of die stamping and rotary extrusion operations carried out on a blank having basically the shape of a cylindrical disc. These operations comprise a rough-shaping phase and a shaping phase, the latter being capable of being carried out in one of two forms.

The wheel thus obtained requires only a few finishing operations and final dimensioning operations, which are known per se.

The rough-shaping phase furthermore comprises three hot die stamping operations which will be designated hereinafter as M1, M2 and M3.

M1 produces the wheel disc and, on its circumference, a thick bead or flange oriented in a direction substantially parallel to the axis of the wheel towards the interior of the said wheel such as previously defined.

M2 produces an elongation and narrowing of the bead in the same direction as M1, and forms the rough shape of the small flange of the rim.

M3 produces a new elongation of the bead in the same direction as M2 and M1 so as to roughly form the shape of the large flange of the rim, and brings the small flange into a shape very close to its final, definitive shape.

In some cases, it is found that it is possible during the die stamping M3 for some "backflow" of excess metal to occur from the central disc in the direction of the junction zone between the disc and the bent part supporting the flanges of the rim. It was found that this disadvantage can be eliminated, which is also an object of the invention, by allowing excess metal to flow back towards the central part of the disc, in the direction opposite the junction zone between the disc and the flanges of the rim; the excess metal will then be removed during the finishing operations by machining. For this, one may proceed directly after the die stamping M2 and make the central bore, or, provide at least one recess or hollow in the die used for the die stamping M3 in order to take the excess metal. In either case, the excess metal will be removed during the final machining.

The shaping phase may comprise two variations: First Variation: The following steps are performed in sequence: drawing, by cylindrical rotary extrusion, of the part of the bead elongated in M3; widening, in a press, of the part which has just been drawn; and shaping, by conical rotary extrusion, of the drawn and widened part which forms the large flange of the rim. Second Variation: The following steps are performed in succession on the part of the bead previously drawn in M3: widening, in a press, of the part elongated in M3; shaping, by conical rotary extrusion, of the part which has been elongated and then widened, resulting in the final, definitive shape of the large flange. The cylindrical rotary extrusion phase may thus be dispensed with, and as a result there are some modifications in the method of finishing by machining.

During the conical and/or cylindrical rotary extrusion operations the wheel, which has been rough-shaped by the die stamping and press widening operations, is clamped between a mandrel and a counter-tip of a rotary extrusion lathe, one being applied against the external surface of the disc and the small flange of the rim, the other being applied against the internal surface of the disc and the internal surface of the elongated and/or drawn and widened portion of the bead. During these operations the cutting wheel is preferably displaced in the axial direction of the wheel, and moves from the interior towards the exterior. The result is that the wheel is applied strongly against the mandrel of the lathe, whereas a displacement of the cutting wheel in the opposite direction would exert a large tractive force which is one of the main difficulties, and is well known, in the rotary extrusion of large units.

Finishing comprises a series of operations, known per se, and which are not special to the process which has just been described. These operations are, basically, forming of the central bore when this has not been effected after M2; smoothing the two surfaces of the disc; drilling bolt holes for securing the wheel to the axle of the vehicle; drilling a passage orifice for the tire inflation valve and an access orifice for the valve of the twin wheel; machining of the channel, walls and seats and possibly of the edges and certain portions of the external surface of the large flange, and possibly of the small flange (the external surface being that opposite the one which receives the tire), in order to give the final dimensions and obtain a surface state which will provide air-tightness for tubeless tires; and heat treatments, known per se, which may be carried out either at the intermediate stages or at the final stage, in order to confer the optimum properties on the metal (mechanical properties and corrosion resistance).

FIGS. 1 to 3 partial vertical sectional views of the wheel rim and show the successive phases of the die stamping M1, M2 and M3.

FIG. 4 is a partial sectional view of the rim showing a variation of the method in which the central bore is made directly after the die stamping M2 and before the die stamping M3.

Figure 5:
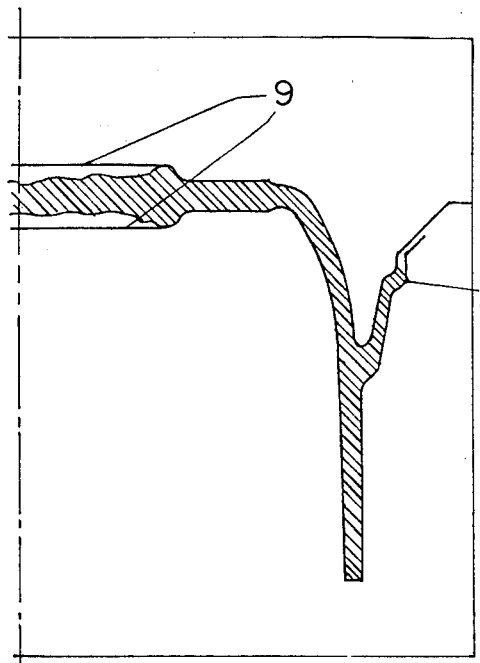
FIG. 5 is a sectional view of the rim showing a variation of the method in which the die stamping M3 is carried out with a die provided with two recesses in which the excess metal may accumulate.

FIG. 1 shows the shape of the bead 1 obtained by the first die stamping M1. The dotted line abc represents diagrammatically the initial rough-shaping into the form of a circular disc. The main axis AB of the bead is substantially perpendicular to the plane CD of the disc.

Die stamping is carried out hot. A temperature of the order of 475° C is suitable for aluminum alloys of the aluminum-silicon-magnesium class, such as 6061, whose average composition is: aluminum base; silicon 0.60%; magnesium 1%; iron <0.50%; zinc <0.25%; copper 0.30%; chromium 0.25%; and nicled <0.05%. The die stamping equipment is at a temperature of about 400° C.

From FIG. 2 it can be seen that the die stamping M2 has elongated the bead 1 which has adopted the shape 2 and at the same time the rough shape 3 of the small flange of the rim appears.

The die stamping M3, FIG. 3, produces a new elongation of the part 2 and leads to a shape 4 of the small flange 3 which is close to its final shape. In some cases, during the die stamping M3 there is the risk that some of the metal of the disc 5 will flow back towards the zone 6 where it may form folds or irregularities. If a central bore 7 is made immediately after M2 and before M3, the excess metal will be able to move in the direction of the interior edge 8 of the fore, from where it will be removed during the final machining.

Figure 6:
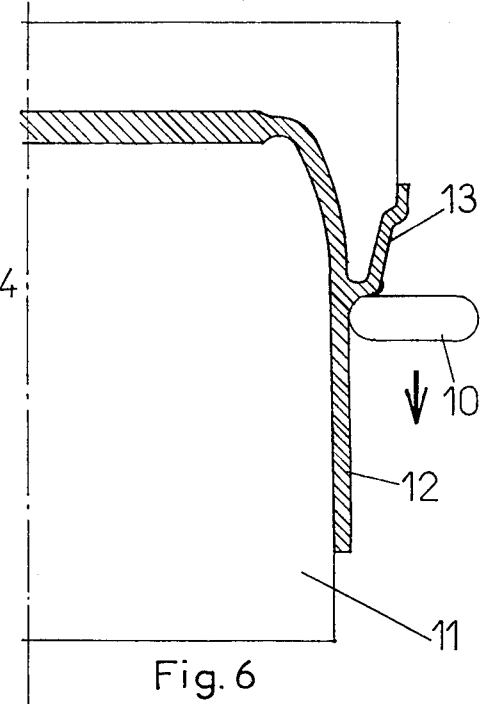
FIGS. 6 to 8 are vertical sections of the rim showing the successive shaping phases according to a first shaping variation.

The cylindrical rotary extrusion operation is shown in FIG. 6 (which forms part of the first variation of shaping). It is important to note that a cutting wheel 10 moving in the direction of the arrow causes the piece to be applied against a mandrel 11 of a lathe which is located in the lower part of the figure. In the prior art processes the cutting wheel moves in both directions. This causes serious difficulties which are well known to the specialists in the field, for when the cutting wheel moves in the opposite direction to the arrow in FIG. 6, the piece in the course of being rotary extruded tends to be torn away from the mandrel of the lathe.

A small flange 13 is also formed during this rotary extrusion.

Figure 7:
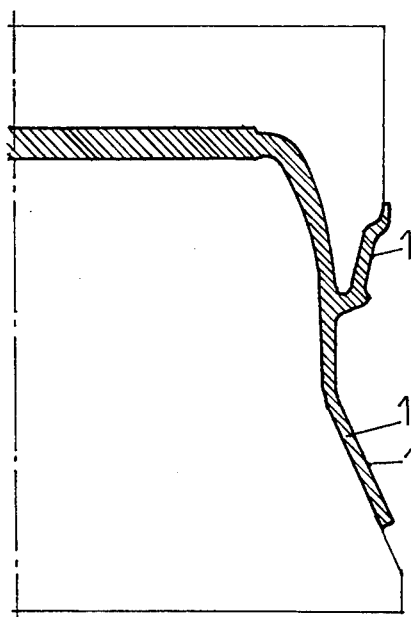
Figure 8:
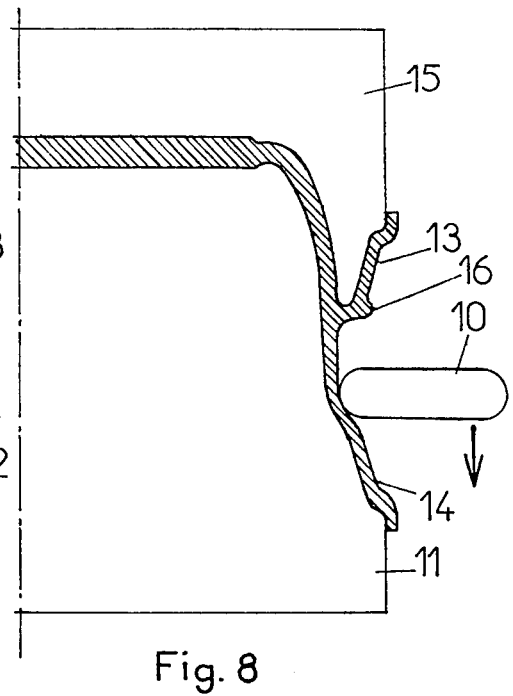
Figure 9:
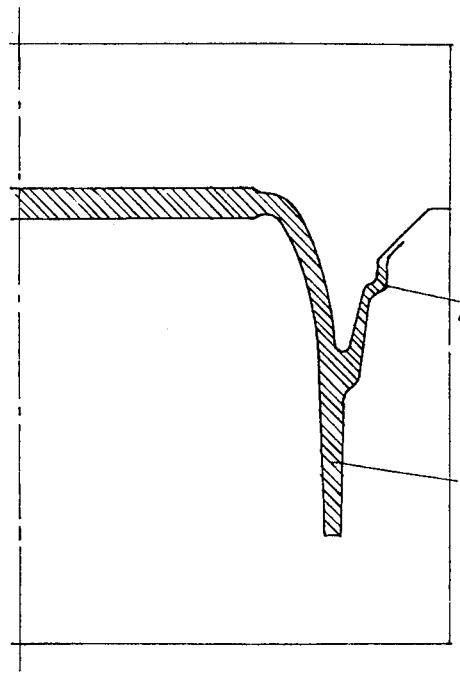
FIG. 9 is a sectional view of the rim and shows another embodiment of die stamping M3 which lends itself better to the second shaping variation.
Figure 10:
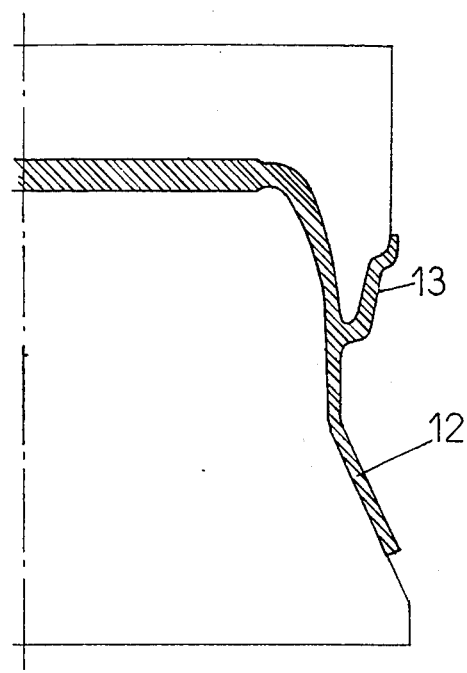
FIGS. 10 and 11 are sectional views which show the successive phases of the second shaping variation (widening in a press and conical rotary extrusion).
Figure 11:
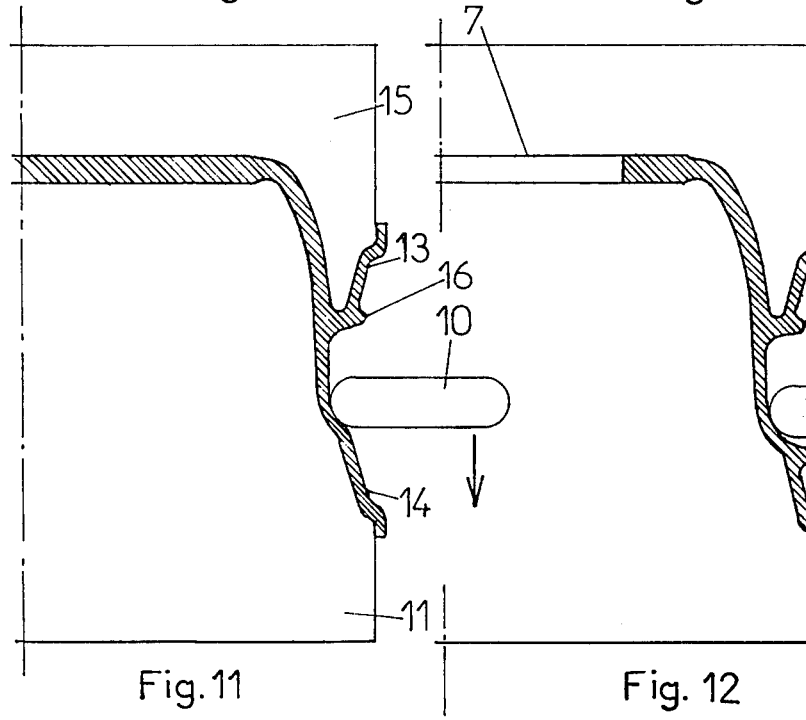

FIG. 7 shows the widening phase of the elongated part 12 so as to form the rough-shaping of the large flange. FIG. 8 shows the shaping phase for the large flange 14 by conical rotary extrusion by means of cutting wheel 10, which moves only in the direction of the arrow for the reason explained above. For this operation, just as for that of FIG. 6, the wheel is clamped between mandrel 11 and a counter-tip 15. FIG. 9 shows another method of performing the die stamping M3 which corresponds to the second shaping variation. It differs from that of FIG. 3 by a larger elongation of the part 2 enabling cylindrical rotary extrusions to be avoided, and the process to proceed to the widening phase in a press as shown in FIG. 10. The following phase, which is a conical rotary extrusion, FIG. 11, does not differ substantially from that shown in FIG. 8.

The starting point of the rotary extrusion operation may also, in a variation, start with the end of the small flange 13 thus ensuring its final shape. During this operation a boss 16 may be produced which is generally known as a "hump" by the specialists in the field, and the object of which is to prevent any sudden separation of the tire from the wheel when the vehicle is running on an under-inflated or deflated tire following a puncture, or under unfavorable conditions.

Figure 12:
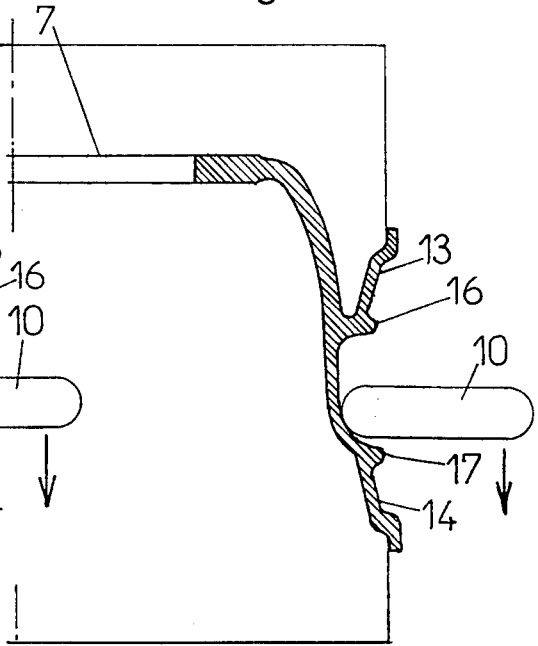
FIG. 12 is a sectional view of the rim showing the formation of a double "hump" during the conical rotary extrusion phase.

When the vehicle has to run under particularly difficult conditions (maximum load, roads in very bad condition), it may be advantageous in order to completely eliminate any risk of separation of a tire to provide a double "hump", one on the small flange and the other on the large flange. FIG. 12 shows the formation of these two "humps" 16 and 17, on the small flange 13 and large flange 14 respectively, during the rotary extrusion operation.

For this purpose it is accordingly sufficient to provide a rotary extrusion template or former. It has also been found that the formation of this second "hump" facilitates the rotary extrusion and helps in avoiding folds in this zone. In FIG. 12 the central bore 7 was made after die stamping M2, but it is quite clear that the double "hump" may be formed even if the bore has not yet been made.

Figure 13:
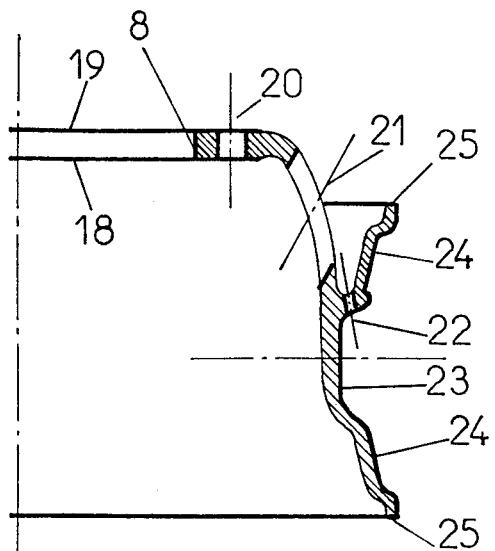
FIGS. 13 and 14 are further sectional views showing the localized sections (thickened lines) of the finishing machining in two different cases, namely in accordance with one of the variations and in accordance with the other variation of shaping.
Figure 14:
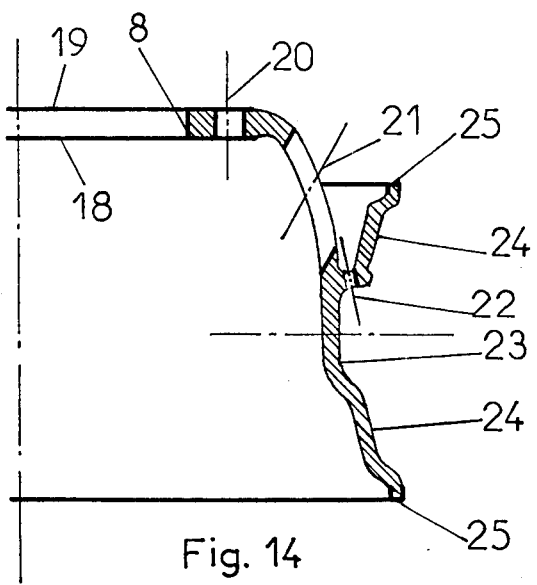

FIG. 13 shows in thickened lines the localized sections of the finishing machining operations in the case where the first variation of shaping is adopted, and FIG. 14 similarly shows the localized sections of the finishing machining operations in the case where the second variation of shaping has been adopted. In this latter case, the machining work is greatly reduced.

In general, the finishing comprises smoothing the two surfaces 18 and 19 of the disc, boring bolt holes 20 for securing the wheel to the hub of the vehicle, the access orifice 21 to the inflation valve of the twin wheel, the valve passage 22, and the final machining of all or part of the channel 23 of the rim, the edges 24 and hooks 25, and of the interior channel 8 of the central bore.

EXAMPLE

A flat disc made of ASG/6061 alloy having the following composition: aluminum base; Si 0.60%; Mg 1%; Fe <0.50%; $Z_n$ <0.25%; Cu 0.30%; Cr 0.25%; and Ni <0.05% having a diameter of 300 mm and a thickness of 205 mm, was transformed in accordance with the sequence of operations corresponding to the first variation, namely die stamping M1 in a press of maximum capacity 20,000 tons according to FIG. 1, at 475° C; die stamping M2 under the same conditions, according to FIG. 2; die stamping M3 under the same conditions, according to FIG. 3, followed by drawing of the large flange by cylindrical rotary extrusion according to FIG. 6, widening in a press according to FIG. 7 and finally conical rotary extrusion according to FIG. 8.

The final machining produces the result shown in FIG. 13. The wheel obtained has dimensions of 22.5-7.5 (expressed in inches of 25.4 mm as is the convention for this type of material, i.e., 57-19 cm) and takes standard size (11-225) tires. Its weight is 23 kg, i.e., roughly half the weight of a conventional type of steel wheel (pressed and welded).

The total weight gain for a truck equipped with this type of wheel may thus be as much as 300 to 400 kg. The high thermal conductivity of aluminum and its alloys helps considerably in removing and dissipating the heat from the brake system and prevents localized overheating which would be very detrimental to the life of tires and tubes. Furthermore, the reduction in weight of the wheels improves the comfort when traveling in the vehicle on account of the fact that there is less nonsuspended or unsprung weight, and makes braking more efficient by reducing the kinetic energy of the rotating masses, which is dissipated as heat during braking.

Of course the operation of the invention is not restricted to the 6061 alloy taken as an example. All metal alloys capable of being shaped by die stamping and rotary extrusion and having sufficient mechanical characteristics to constitute wheels of large tanker vehicles fall within the scope of the invention.

We claim:

1. A process for manufacturing monobloc metal wheels for vehicles from a rough shaped cylindrical disc comprising the following steps:
   a. a first die stamping (M1) which forms the wheel disc and on its circumference a thick bead oriented in a direction parallel to the wheel axis and the inner side of the wheel;
   b. a second die stamping (M2) which produces an elongation of said bead in the same direction as in said first die stamping and forms in a rough shape a small flange of the rim;
   c. a third die stamping (M3) which forms an additional elongation of said bead in the same direction as in the first and second die stamping and further forms said small flange of the rim in almost its final shape;
   d. cylindrical rotary extrusion of the disc to provide additional elongation in the same direction parallel to the axis and the inner side of said wheel;
   e. widening out in a press of the part elongated in step (d) which roughly shapes a large flange of the rim; and
   f. conical rotary extrusion to complete the shaping of said large flange.

2. A process for manufacturing monobloc metal wheels for vehicles from a rough shaped cylindrical disc comprising the following steps:
   a. a first die stamping (M1) which forms the wheel disc and on its circumference a thick bead oriented in a direction parallel to the wheel axis and the inner side of the wheel;
   b. a second die stamping (M2) which produces an elongation of said bead in the same direction as in said first die stamping and forms in a rough shape a small flange of the rim;
   c. a third die stamping (M3) which produces an additional elongation of said bead in the same direction as in the first and second die stampings to give it a length which is substantially equal to the final length of a large flange of the rim, and which brings said small flange into a shape close to its final shape;
   d. widening out in a press of the part elongated in step (c), which roughly shapes said large flange; and
   e. conical rotary extrusion to complete the shaping of said large flange.

3. A process as defined in claim 1 wherein during the rotary extrusion stages the disc is clamped between a mandrel and a counter-tip of a lathe and a cutting wheel is displaced in the axial direction of the disc, from the interior to the exterior, so that the force exerted by the said cutting wheel urges the disc against said mandrel.

4. A process as defined in claim 2 wherein during the rotary extrusion stages, the disc is clamped between a mandrel and a counter-tip of a lathe and a cutting wheel is displaced in the axial direction of the disc, from the interior to the exterior, so that the force exerted by the said cutting wheel urges the disc against said mandrel.

5. A process as defined in claim 1 wherein a central bore is formed in said disc after the second die stamping stage and before the third die stamping stage.

6. A process as defined in claim 2 wherein a central bore is formed in said disc after the second die stamping stage and before the third die stamping stage.

7. A process as defined in claim 1 wherein at least one recess is provided in the third die stamping stage in which excess metal from the disc may accumulate.

8. A process as defined in claim 2 wherein at least one recess is provided in the third die stamping stage in which excess metal from the disc may accumulate.

9. A process as defined in claim 3 wherein during the cylindrical rotary extrusion stage said cutting wheel starts from the end of the small flange so as to form a boss or hump in the vicinity of the connecting zone between the disc and the rim.

10. A process as defined in claim 9 wherein a boss or hump is also formed on the large flange of the rim.

* * * * *